W. W. BOWMAN.
DEMOUNTABLE RIM.
APPLICATION FILED JUNE 9, 1917.
1,301,033.
Patented Apr. 15, 1919.
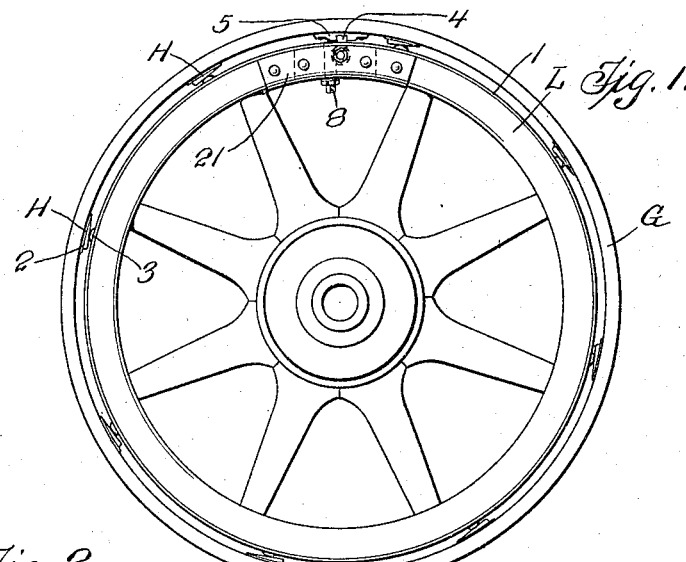
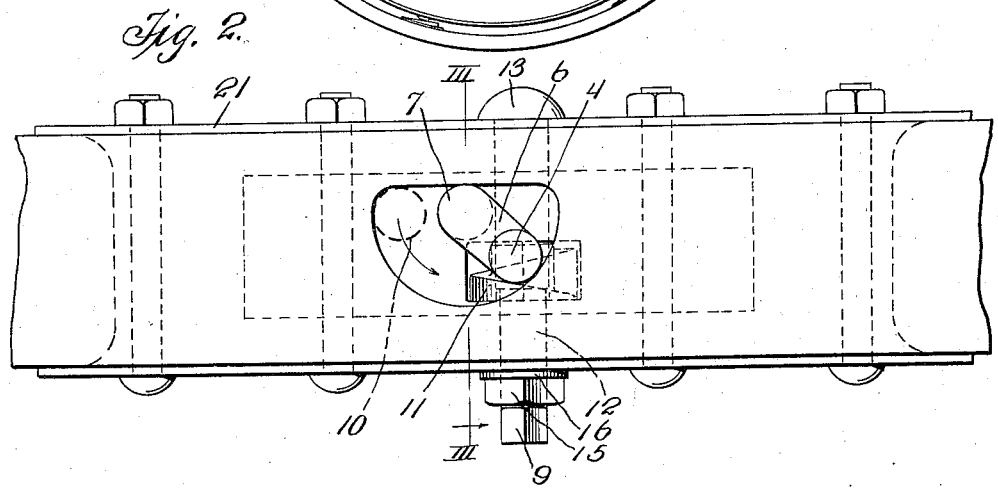
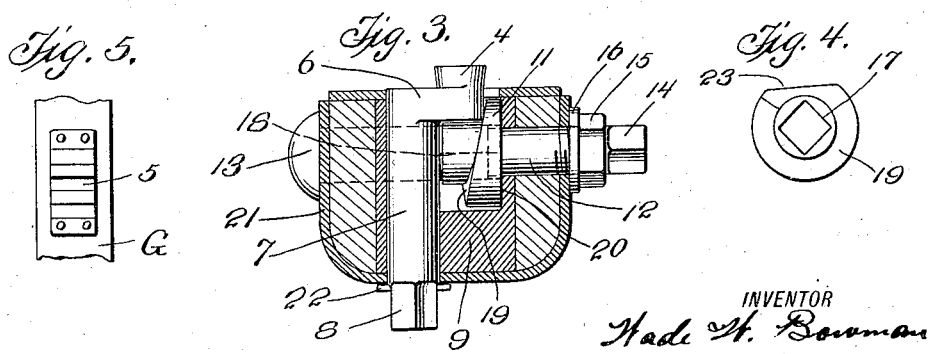
INVENTOR
Wade W. Bowman
BY
ATTORNEY

UNITED STATES PATENT OFFICE.

WADE W. BOWMAN, OF NEW YORK, N. Y.

DEMOUNTABLE RIM.

1,301,033.　　　Specification of Letters Patent.　　Patented Apr. 15, 1919.

Application filed June 9, 1917. Serial No. 173,727.

*To all whom it may concern:*

Be it known that I, WADE W. BOWMAN, a citizen of the United States, residing at New York, in the county of New York and State of New York, have invented certain new and useful Improvements in Demountable Rims, of which the following is a specification.

This invention relates to an automobile rim particularly adapted for use in connection with automobile and like wheels.

The object of the invention is to provide a simple but highly efficient means whereby the removable rim may be easily connected to or removed from the fixed rim of the wheel.

A further object is to provide a device which may be incorporated into wheel structures now in common use, that is a device which will not require a specially built wheel to carry it.

A more detailed object is to provide a device by means of which the removable rim may be moved into or out of its fixed position without necessity for manipulating the multiplicity of clamp nuts or other like parts as heretofore required, and which when in its final position will be held immovable irrespective of wear or inaccuracies of manufacture.

A further object is to provide a simple lever device for rotating the movable rim about the fixed rim and to provide means acting upon the lever to force it toward, and to lock it in, retaining position.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:

Figure 1 is a side elevational view of a wheel constructed in accordance with this invention.

Fig. 2 is an enlarged detail edge view of a portion of the wheel shown in Fig. 1, and Fig. 3 is a transverse section view taken upon the plane of line III of Fig. 1.

Fig. 4 is a detail view of the tightening cam detached, and Fig. 5 is a fragmentary detail view.

Referring to the drawings for describing in detail the structure which is illustrated therein, the reference character L indicates the wheel felly having the fixed rim 1 thereon. The reference character G indicates the movable rim.

At spaced points circumferentially between the fixed and movable rims are a series of coöperative wedge-acting parts H. These are shown in detail and described and claimed in my copending application Serial No. 173,726, filed June 9, 1917, for demountable rim.

Briefly, they each comprise a wedge plate 2 and a rib 3. In the present case the wedge 2 is shown to be carried by the movable rim and the rib is shown to be carried by the fixed rim, this arrangement being the reverse of that shown in said copending application. The function of the parts is the same, namely that interrotation between the fixed and movable rims will cause the ribs 3 to move toward the highest parts of the wedges and thereby to cause the movable rim to be held firmly against movement with respect to the fixed rim.

The means for rotating the fixed and movable rims with respect to each other is the essential characteristic of the present application. It includes a lug 4 projecting outwardly from the fixed rim into engagement within a socket 5 formed upon the movable rim in the same manner as in said copending application. The lug 4 is carried at the outer end of a lever arm 6 which in turn is formed at the outer end of a rotatable shaft 7. The inner end of the shaft projects through the inner surface of the felly and is squared, as at 8, for the application of a suitable tool by means of which the shaft may be rotated in either direction.

The shaft is journaled in a housing 9 which is fitted within a recess formed in the felly.

The socket 5 engages over the lug when the movable rim is slid onto the fixed rim, the lug being approximately in the position indicated by the dotted lines 10 in Fig. 2. Rotation of the shaft in the direction indicated by the arrow moves the lug, and consequently the movable rim, in a direction to tighten the wedge parts 2 and 3. The coarser movements in this direction are readily taken care of by the tool engaging the squared end 8 of the shaft. The finer or final movements require somewhat more force than may be imparted through the part 8, hence this invention includes the provision of a cam 11 disposed in such position as to engage against the outer end of the arm 6 for moving it with great force toward its final position.

This cam is carried upon a shaft 12 which is rotatably mounted within the housing 9 transversely of the felly. The opposite ends of the shaft 12 project through the side surfaces of the felly. One of said ends is provided with a head 13, and the remaining end is squared as at 14, for the application of a suitable tool by means of which to rotate the shaft. A lock-nut 15 and a lock-washer 16 are provided for retaining the shaft 12 in any position of rotation.

The cam 11 is mounted to have a certain longitudinal movement upon the shaft 12 while being fixed to rotate positively with said shaft. This may be accomplished in any suitable manner but preferably by providing the cam with a squared opening 17 for engaging the squared portion 18 of the shaft.

A spiral cam surface 19 is provided for engaging the end of the lever arm 6 and a smooth flat surface 20 is provided for rotating against the adjacent flat wall part of the housing.

A cover plate 21 may be fitted about the felly to reinforce it in the vicinity of the recess cut to receive the housing 9. This cover plate also serves as a bearing member to receive the pressure from the head 13 of the shaft 12 and from the lock-nut and washer 15—16.

In operation, after the rims have been moved as far as possible by the tool upon the part 8, the shaft 12 is then rotated to wedge against the end of the arm 6. A powerful pressure may thus be exerted to move the rims to their final positions, after which the lock-nut 15 may be tightened down and it will be thereafter impossible for the arm 6 to rotate until the lock-nut has been loosened and the shaft 12 rotated backwardly.

It will be noted that, by reason of the free movement of the cam longitudinally of its shaft, no movement of the cam away from the end of the arm 6 is caused by the tightening down of the lock-nut 15. A thrust from the arm 6 is imparted directly to the opposing wall of the housing and is constant irrespective of whether the nut 15 is tightened or not. The tightening action of the nut may cause the shaft to draw through the cam a trifle but will impart no movement to the cam.

The cam 11 may have a flattened peripheral portion, as shown at 23 in Fig. 4, so as to clear the end of the arm 6 during the operation of the device.

As many changes could be made in this construction without departing from the scope of the invention as defined in the following claims, it is intended that all matter contained in the above description or shown in the accompanying drawings, shall be interpreted as illustrative only and not in a limiting sense.

Of course the lug 4 has sliding movement transversely of the rim G within the socket 5 during the rotation of the shaft 7.

Having thus described my invention, what I claim as new and desire to secure by Letters Patent is:

1. A wheel comprising a fixed rim and a movable rim, means whereby to connect said rims together by a rotary movement of one rim relatively to the other, and a spiral cam rotatably carried by one rim having its cam surface disposed to engage a part connected with the other rim, said part being provided with a crank arm which is free to swing, whereby rotation of said cam will rotate said rims relatively to each other.

2. A wheel comprising a fixed rim and a movable rim, means whereby to connect said rims together by a rotary movement of one rim relatively to the other, a spiral cam rotatably carried by one rim having its cam surface disposed to engage a part connected with the other rim whereby rotation of said cam will rotate said rims relatively to each other, said part being provided with a crank arm free to swing and means to lock the cam in its rotated position.

3. A wheel comprising a fixed rim and a movable rim, means whereby to connect said rims together by a rotary movement of one rim relatively to the other, a cam movably carried by one rim having its cam surface disposed to engage a part connected with the other rim whereby movement of said cam will move said rims relatively to each other, the part with which the cam engages comprising a crank arm, and the cam being arranged to swing said crank arm.

4. A wheel comprising a fixed rim and a movable rim, means whereby to connect said rims together by a rotary movement of one rim relatively to the other, a cam movably carried by one rim having its cam surface disposed to engage a part connected with the other rim whereby movement of said cam will move said rims relatively to each other, the part with which the cam engages comprising a crank arm pivotally mounted upon the cam carrying rim and having its free end slidably engaging the other rim, and the cam being arranged to swing said crank arm.

5. A wheel comprising a fixed rim and a movable rim, means whereby to connect said rims together by a rotary movement of one rim relatively to the other, a cam movably carried by one rim having its cam surface disposed to engage a part connected with the other rim whereby movement of said cam will move said rims relatively to each other, the part with which the cam engages comprising a crank arm pivotally mounted upon the cam carrying rim and having its free end slidably engaging the other rim, means whereby the crank arm may be swung to move said rims toward their final positions, and the cam being arranged to engage the crank arm to move it farther and to thereby move the rims farther toward their final position.

6. A wheel comprising a fixed rim and a movable rim, means whereby to connect said rims together by a rotary movement of one rim relatively to the other, a crank shaft rotatably carried by the fixed rim and having a crank arm thereon the free end of which is arranged to engage the movable rim, means whereby to rotate the crank shaft to cause the crank arm to move the movable rim toward its final position, and means for engaging the free end of the crank arm operable to force said free end in one direction and thereby to force the movable rim farther toward its final position.

7. A wheel comprising a fixed rim and a movable rim, means whereby to connect said rims together by a rotary movement of one rim relatively to the other, a crank shaft rotatably carried by the fixed rim and having a crank arm thereon the free end of which is arranged to engage the movable rim, means whereby to rotate the crank shaft to cause the crank arm to move the movable rim toward its final position, a cam shaft rotatably carried by the fixed rim, and a cam thereon operable, by rotation of the cam shaft, to force the crank arm farther toward its final position and thereby to force the movable rim farther toward its final position.

8. A wheel having a fixed rim and a movable rim, said two rims having wedge-acting parts adapted when the movable rim is moved laterally over the fixed rim to assume position for coöperating with each other upon subsequent inter-rotation between said two rims, one of said rims having a crank arm pivotally mounted thereon, the free end of the crank arm comprising a lug projecting from one rim toward the other, the second rim having a part movable into position adjacent the lug when the movable rim is moved laterally over the fixed rim, means for swinging the crank to shift the position of the lug and produce such inter-rotation between the fixed and movable rims as to cause said wedge-acting parts to approach their final positions, and other means for swinging the crank arm to further shift the position of the lug and cause said wedge-acting parts to assume their final positions.

9. A wheel comprising a fixed rim and a movable rim, means whereby to connect said rims together by a rotary movement of one rim relatively to the other, a crank shaft rotatably carried by the fixed rim and having a crank arm thereon the free end of which is arranged to engage the movable rim, means whereby to rotate the crank shaft to cause the crank arm to move the movable rim toward its final position, a cam shaft rotatably carried by the fixed rim, a cam thereon operable, by rotation of the cam shaft, to force the crank arm farther toward its final position and thereby to force the movable rim farther toward its final position, the cam being free to move longitudinally of the cam shaft, and means to limit the movement of the cam longitudinally of the cam shaft.

10. A wheel comprising a fixed rim and a movable rim, mechanism controllable by a rotary movement of one rim relatively to the other for connecting said rims together, a spiral cam revolubly mounted upon one rim and provided with a cam surface, a part carried by the other rim and provided with a bearing surface engaged by said cam surface, and a crank arm mounted upon said last mentioned part and adapted to swing in order to enable rotation of said cam to rotate said rims relatively to each other.

In testimony whereof I affix my signature in the presence of two witnesses.

WADE W. BOWMAN.

Witnesses:
L. GESSFORD HANDY,
MAY SCHULZ.